(12) United States Patent
Sun et al.

(10) Patent No.: US 8,775,398 B2
(45) Date of Patent: Jul. 8, 2014

(54) METHOD AND SYSTEM FOR DETERMINING AN ORDER OF PRESENTATION OF SEARCH RESULTS

(75) Inventors: Ken Sun, Palo Alto, CA (US); Sanjay Pundlkrao Ghatare, San Jose, CA (US); Olivier G. Dumon, San Francisco, CA (US); Julie Netzloff, San Jose, CA (US); Muhammad Faisal Rehman, San Jose, CA (US); Ryan McDonald, San Francisco, CA (US)

(73) Assignee: eBay Inc., San Jose, CA (US)

( * ) Notice: Subject to any disclaimer, the term of this patent is extended or adjusted under 35 U.S.C. 154(b) by 326 days.

(21) Appl. No.: 12/475,997

(22) Filed: Jun. 1, 2009

(65) Prior Publication Data

US 2010/0306205 A1    Dec. 2, 2010

(51) Int. Cl.
*G06F 17/30* (2006.01)
*G06F 17/00* (2006.01)

(52) U.S. Cl.
USPC .......................................... 707/706; 707/707

(58) Field of Classification Search
USPC ................................................. 707/706, 707
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,823,265 A | 4/1989 | Nelson | |
| 4,864,516 A | 9/1989 | Gaither et al. | |
| 4,903,201 A | 2/1990 | Wagner | |

(Continued)

FOREIGN PATENT DOCUMENTS

| CA | 2253543 A1 | 3/1997 |
|---|---|---|
| FR | 2658635 A1 | 8/1991 |

(Continued)

OTHER PUBLICATIONS

Hammouda, "Efficient Phrase-Based Document Indexing for Web Document Clustering", Oct. 2004, Published by: IEEE Transactions on Knowledge and data engineering, vol. 16, No. 10, pp. 1279-1297.*

(Continued)

*Primary Examiner* — Yicun Wu
(74) *Attorney, Agent, or Firm* — Schwegman Lundberg & Woessner, P.A

(57) ABSTRACT

A method and system for determining an order of presentation of the search results is provided. An example system comprises a search request detector, a search engine, and an intermingler. The search request detector may be configured to receive a search request, and the search engine may be configured to determine search results based on the search request. The search results may comprise a first set of items in a first format and a second set of items in a second format. The number of items in the first set and the number of items in the second may reflect a predetermined target ratio and respective exposure percentages for items in the first format and items in the second format. The intermingler may be configured to determine an order of presentation of the search results in a list of search results based on the target ratio.

20 Claims, 7 Drawing Sheets

(56) References Cited

U.S. PATENT DOCUMENTS

| | | | |
|---|---|---|---|
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,553,145 A | 9/1996 | Micali |
| 5,557,728 A | 9/1996 | Garrett et al. |
| 5,596,944 A | 1/1997 | Massie |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,666,524 A | 9/1997 | Kunkel et al. |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,727,165 A | 3/1998 | Ordish et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,974,412 A | 10/1999 | Hazlehurst et al. |
| 5,987,440 A | 11/1999 | O'Neil et al. |
| 5,991,739 A | 11/1999 | Cupps et al. |
| 6,023,683 A | 2/2000 | Johnson et al. |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,417 A | 5/2000 | Hess et al. |
| 6,061,448 A | 5/2000 | Smith et al. |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,178,408 B1 | 1/2001 | Copple et al. |
| 6,192,407 B1 | 2/2001 | Smith et al. |
| 6,202,051 B1 | 3/2001 | Woolston |
| 6,243,691 B1 | 6/2001 | Fisher et al. |
| 6,415,320 B1 | 7/2002 | Hess et al. |
| 6,466,918 B1 | 10/2002 | Spiegel et al. |
| 6,466,919 B1 | 10/2002 | Walker et al. |
| 6,587,838 B1 | 7/2003 | Esposito et al. |
| 6,934,690 B1 | 8/2005 | Van Horn et al. |
| 7,212,996 B1 | 5/2007 | Carnahan et al. |
| 7,373,317 B1 | 5/2008 | Kopelman et al. |
| 7,428,505 B1 | 9/2008 | Levy et al. |
| 8,428,996 B2 | 4/2013 | Grove et al. |
| 2001/0021924 A1 | 9/2001 | Ohno |
| 2002/0026369 A1 | 2/2002 | Miller et al. |
| 2002/0082932 A1 | 6/2002 | Chinnappan et al. |
| 2002/0184059 A1 | 12/2002 | Offutt, Jr. et al. |
| 2007/0255702 A1* | 11/2007 | Orme ................................ 707/5 |
| 2008/0046336 A1* | 2/2008 | Mosleh ............................ 705/26 |
| 2010/0070486 A1* | 3/2010 | Punaganti Venkata et al. ........................... 707/722 |
| 2013/0018756 A1 | 1/2013 | Grove |

FOREIGN PATENT DOCUMENTS

| | | |
|---|---|---|
| JP | 11-007452 | 1/1999 |
| KR | 19977005795 A | 10/1997 |
| KR | 20000054343 A | 9/2000 |
| NL | 9300266 | 2/1993 |
| WO | WO-9215174 A1 | 9/1992 |
| WO | WO-9517711 A1 | 6/1995 |
| WO | WO-9607149 A1 | 3/1996 |
| WO | WO-9634356 A1 | 10/1996 |
| WO | WO-9737315 A1 | 10/1997 |
| WO | WO-9963461 A1 | 12/1999 |
| WO | WO-0025218 A1 | 5/2000 |
| WO | WO-0188796 A1 | 11/2001 |
| WO | WO-2010141473 A1 | 12/2010 |

OTHER PUBLICATIONS

"U.S. Appl. No. 10/023,583, Advisory Action mailed May 23, 2008", 3 pgs.

"U.S. Appl. No. 10/023,583, Final Office Action mailed Apr. 16, 2009", 14 pgs.

"U.S. Appl. No. 10/023,583, Final Office Action mailed Nov. 29, 2007", 12 pgs.

"U.S. Appl. No. 10/023,583, Non Final Office Action mailed Apr. 9, 2007", 6 pgs.

"U.S. Appl. No. 10/023,583, Non Final Office Action mailed Sep. 15, 2008", 10 pgs.

"U.S. Appl. No. 10/023,583, Non-Final Office Action mailed Jul. 8, 2010", 12 pgs.

"U.S. Appl. No. 10/023,583, Non-Final Office Action mailed Sep. 28, 2009", 16 pgs.

"U.S. Appl. No. 10/023,583, Non-Final Office Action mailed Sep. 15, 2008.", 12 pgs.

"U.S. Appl. No. 10/023,583, Pre-Appeal Brief Request filed May 28, 2008", 5 pgs.

"U.S. Appl. No. 10/023,583, Response filed Jan. 28, 2010 to Non Final Office Action mailed Sep. 28, 2009", 20 pgs.

"U.S. Appl. No. 10/023,583, Response filed Jan. 29, 2008 to Final Office Action mailed Nov. 29, 2007", 19 pgs.

"U.S. Appl. No. 10/023,583, Response filed Jul. 16, 2009 to Final Office Action mailed Apr. 16, 2009", 15 pgs.

"U.S. Appl. No. 10/023,583, Response filed Aug. 9, 2007 to Non-Final Office Action mailed Apr. 9, 2007", 17 pgs.

"U.S. Appl. No. 10/023,583, Response filed Nov. 8, 2010 to Non Final Office Action mailed Jul. 8, 2010", 20 pgs.

"U.S. Appl. No. 10/023,583, Response filed Dec. 15, 2008 to Non-Final Office Action mailed Sep. 15, 2008", 20 pgs.

"U.S. Appl. No. 10/023,583, Supplemental Preliminary Amendment filed Aug. 21, 2006", 16 pgs.

"Chinese Application Serial No. 02811759.X, First Office Action mailed Apr. 3, 2007", 10 pgs.

"Chinese Application Serial No. 02811759.X, Office Action mailed Jun. 6, 2008", 5 pgs.

"Chinese Application Serial No. 02811759.X, Office Action mailed Oct. 21, 2009", 10 pgs.

(56) References Cited

OTHER PUBLICATIONS

"Chinese ApplicationSerial No. 02811759.X, Office Action mailed on Feb. 27, 2009", 3 pgs.
"eDeal Marketplace Internet Site", eDeal Services Corp., Edeal Auctions-InterActive Classifieds, (Jul. 12, 2002).
"International Application Serial No. PCT/US02/04600, International Search Report mailed Oct. 2, 2002", 9 pgs.
"International Application Serial No. PCT/US10/036907, International Search Report and Written Opinion mailed Jul. 28, 2010", 9 pgs.
"International Application Serial No. PCT/US2010/036907 Search Report mailed Jul. 28, 2010", 30 pgs.
"InterShopZone, The Online Interactive Marketplace Internet Site", Auctionweiser Enterprises, Inc., [Online]. Retrieved from the Internet: <URL: Http://www.Auctionweister.com/auction/index.asp>, (Jul. 12, 2002).
"Introduction for online shopping: a shopping on Internet for first time (written in Japanese language)", Mobile i, Softbank Publishing K.K., 6 (6), (Jun. 1, 2000), 109.
"Japanese Application Serial No. 2003-504306, Final Office Action mailed Sep. 9, 2008", 5 pgs.
"Japanese Application Serial No. 2003-504306, Office Action mailed Jan. 15, 2008", 10 pgs.
"Korean Application Serial No. 10-2007-7029722, Office Action mailed Mar. 13, 2008", 16 pgs.
"Korean Application Serial No. 10-2007-7029722, Supplemental Appeal Brief filed Mar. 19, 2010", 14 pgs.
"Korean Application Serial No. 10-2009-7007814, Office Action mailed Jul. 15, 2009", 9 pgs.
"Korean Application Serial No. 2003-7016152 Trial Decision mailed Jul. 8, 2008", 10 pgs.
"Korean Application Serial No. 2007-7029722, Office Action mailed Mar. 7, 2009", 16 pgs.
"Korean Application Serial No. 2007-7029722, Office Action mailed Jun. 19, 2009", 10 pgs.
"Onsale Joins Fray as Online Shopping Picks Up Speed: Internet Booms", Computer Reseller News, CMP Publications, Inc., USA, (Jun. 5, 1995), 1 pg.
"Onsale: Onsale Brings Thrill of Auctions and Bargain Hunting Online; Unique Internet retail service debuts with week-long charity auction for The Computer Museum in Boston", Business Wire, Dialog Web. 0489267 BW0022, (May 24, 1995), 3 pages.
Baumann, G. W, "Personal Optimized Decision/Transaction Program", IBM Technical Disclosure Bulletin (Jan. 1995), 83-84.
Business Wire, "Mediappraise Receives National Award for Web-based Technology That Enables Companies to Solve Thorny HR Problem", Business Wire, (Dec. 14, 1998), 1-2.
Clemons, E, "Evaluating the prospects for alternative electronic securities", Proceedings of ICIS 91: 12th International Conference on Information Systems, (Dec. 16-18, 1991), 53-61.
Graham, I, "The Emergence of Linked Fish Markets in Europe", Focus Theme, 1-3.
Hammouda, et al., "Efficient Phrase-Based Document Indexing for Web Document Oustering in", IEEE Transactions on Knowledge and Data Engineering, Oct. 2004, vol. 16, No. 10, [Online]. Retrieved from the Internet: <URL: http://watnow.uwaterloo.calpubhammouda/hammouda-ieee-tkde-oct04.pdf>, (Oct. 2004), pp. 1279-1296.
Hauser, R, "Anonymous Delivery of Goods in Electronic Commerce", IBM Technical Disclosure Bulletin, 39(3), (Mar. 1996), 363-366.
Hess, C M, et al., "Computerized Loan Organization System: An Industry Case Study of the Electronic Markets Hypothesis", MIS Quarterly, vol. 18(3), (Sep. 1994), 251-274.
Jiro, M., et al., "Thorough guide for Net auction: Yahoo! Auction, eBay Japan (written in Japanese language)", 1st Edition, Sotechsha (Publisher), (Jun. 1, 2000), 39-41.
Klein, S, "Introduction to Electronic Auctions", Focus Theme, 1-4.
Lee, H G, "Aucnet: Electronic Intermediary for Used-Car Transactions", Focus Theme, 1-5.
Lee, H. G, "Electronic brokerage and electronic auction: the impact of IT on market structures", Proceedings of the Twenty-Ninth Hawaii International Conference on System Sciences, vol. 4, (1996), 397-406.
Malone, T., et al., "Electronic Markets and Electronic Hierarchies", Communications of the ACM, 14(25), (Jun. 1987), 484-497.
Mardesich, Jodi, "Site Offers Clearance for End-of-Life Products—Onsale Takes Auction Gavel Electronic", Computer Reseller News, (Jul. 8, 1996), 2 pps.
Massimb, Marcel, "Electronic Trading, Market Structure and Liquidity", Financial Analysts Journal, 50(1), (Jan./Feb. 1994), 39-50.
Meade, J., "Visual 360: A Performance Appraisal System That's 'Fun'", HR Magazine, Society for Human Resource Management., (Jul. 1999), 3 pgs.
Neo, B S, "The implementation of an electronic market for pig trading in Singapore", Journal of Strategic Information Systems; vol. 1(5), (Dec. 1992), 278-288.
Nobuhiro, S., "What site is influential as a portal (Japanese w/translation)", Nikkei Computer, Nikkei Business Publication Inc. (Publisher), 454, (Oct. 12, 1998), 98-99.
Post, D L, et al., "Application of auctions as a pricing mechanism for the interchange of electric power", IEEE Transactions on Power Systems, 10(3), (Aug. 1995), 1580-1584.
Preist, Chris, et al., "Adaptive Agents in a Persistent Shout Double Auction", International Conference on Information and Computation Economies, Proceedings of the first international conference on Information and computation economies, (1999), 11-18.
Reck, M., "Formally Specifying an Automated Trade Execution System", The Journal of Systems and Software, 1993, Elsevier Science Publishing, USA, (1993), 245-252.
Reck, Martin, "Trading-Process Characteristics of Electronic Auctions", Focus Theme, 1-7.
Resnick, Paul, "Reputation systems", Communications of the ACM, 43(12), (Dec. 2000), 45-48.
Rockoff, T E, et al., "Design of an Internet-based system for remote Dutch auctions", Internet Research: Electronic Networking Applications and Policy, vol. 5(4), (Jan. 1, 1995), 10-16.
Schmid, B F, "The Development of Electronic Commerce", EM—Electronic Markets, No. 9-10, (Oct. 1993), 2 pgs.
Siegmann, Ken, "Nowhere to go but up", PC Week; vol. 12(42), Ziff-Davis Publishing Company, (Oct. 23, 1995), 1-3.
Takehiko, O., et al., "How to receive benefits in Auction: Yahoo! Auction—50 hints for sales and auctions", Ascii Net J, Ascii Corp. (Publisher), 5, (Dec. 22, 2000), 2 pgs.
Tjostheim, Ingvar, "A case study of an on-line auction for the World Wide Web", Norwegian Computing Center (NR), 1-10.
Turban, E, "Auctions and Bidding on the Internet: An Assessment", Focus Theme, 1-5.
Van Heck, E., et al., "Experiences with Electronic Auctions in the Dutch Flower Industry", Focus Theme, Erasmus University, The Netherlands, 6 pgs.
Warbelow, A, et al., "Aucnet: TV Auction Network System", Harvard Business School Case/Study, HBVR#9-190-001, USA, (Jul. 1989), 1-15.
Zwass, V., "Electronic Commerce: Structures and Issues", International Journal of Electronic Commerce, Fall 1996, vol. 1, No. 1, (Fall 1996), 3-23.
"U.S. Appl. No. 10/023,583, Final Office Action mailed Feb. 3, 2011", 13 pgs.
"U.S. Appl. No. 10/023,583, Non Final Office Action mailed Oct. 20, 2011",14 pgs.
"U.S. Appl. No. 10/023,583, Pre-Appeal Brief Request mailed Aug. 3, 2011", 5 pgs.
"International Application Serial No. PCT/US2010/036907, International Preliminary Report on Patentability mailed Dec. 15, 2011", 8 pgs.
"U.S. Appl. No. 10/023,583, Notice of Allowance mailed Jan. 25, 2013", 9 pgs.
"U.S. Appl. No. 13/621,092, Preliminary Amendment filed Mar. 7, 2013", 10 pgs.

(56) References Cited

OTHER PUBLICATIONS

"U.S. Appl. No. 13/621,092, Examiner Interview Summary mailed Sep. 17, 2013", 3 pgs.

"U.S. Appl. No. 13/621,092, Non Final Office Action mailed Jun. 14, 2013", 17 pgs.

"U.S. Appl. No. 13/621,092, to Non Final Office Action mailed Sep. 16, 2013", 21 pgs.

"U.S. Appl. No. 13/621,092, Notice of Allowance mailed Dec. 6, 2013", 12 pgs.

"European Application Serial No. 10783927.6, Office Action mailed Jan. 24, 2012", 2 pgs.

"European Application Serial No. 10783927.6, Response filed Jun. 8, 2012 to Office Action mailed Jan. 24, 2012", 11 pgs.

"U.S. Appl. No. 10/023,583, Appeal Brief filed Aug. 21, 2012", 28 pgs.

"U.S. Appl. No. 10/023,583, Decision on Pre-Appeal Brief Request mailed Sep. 7, 2011", 2 pgs.

"U.S. Appl. No. 10/023,583, Notice of Allowance mailed Sep. 26, 2012", 9 pgs.

\* cited by examiner

METHOD AND SYSTEM FOR DETERMINING AN ORDER OF PRESENTATION OF SEARCH RESULTS

TECHNICAL FIELD

This application relates to a computer-implemented method and system for determining an order of presentation of search results.

BACKGROUND

When a user submits a search request via a web page, a search engine (e.g., a search engine designed to search for information on the World Wide Web or a search engine designed to search for items available within a particular on-line trading platform) may be able to sort through the vast amount of data and present the user with results that match the terms in the search request. With some search engines, matches may even be ranked, so that the most relevant results are displayed at the top of the search results list presented on the user's display device.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
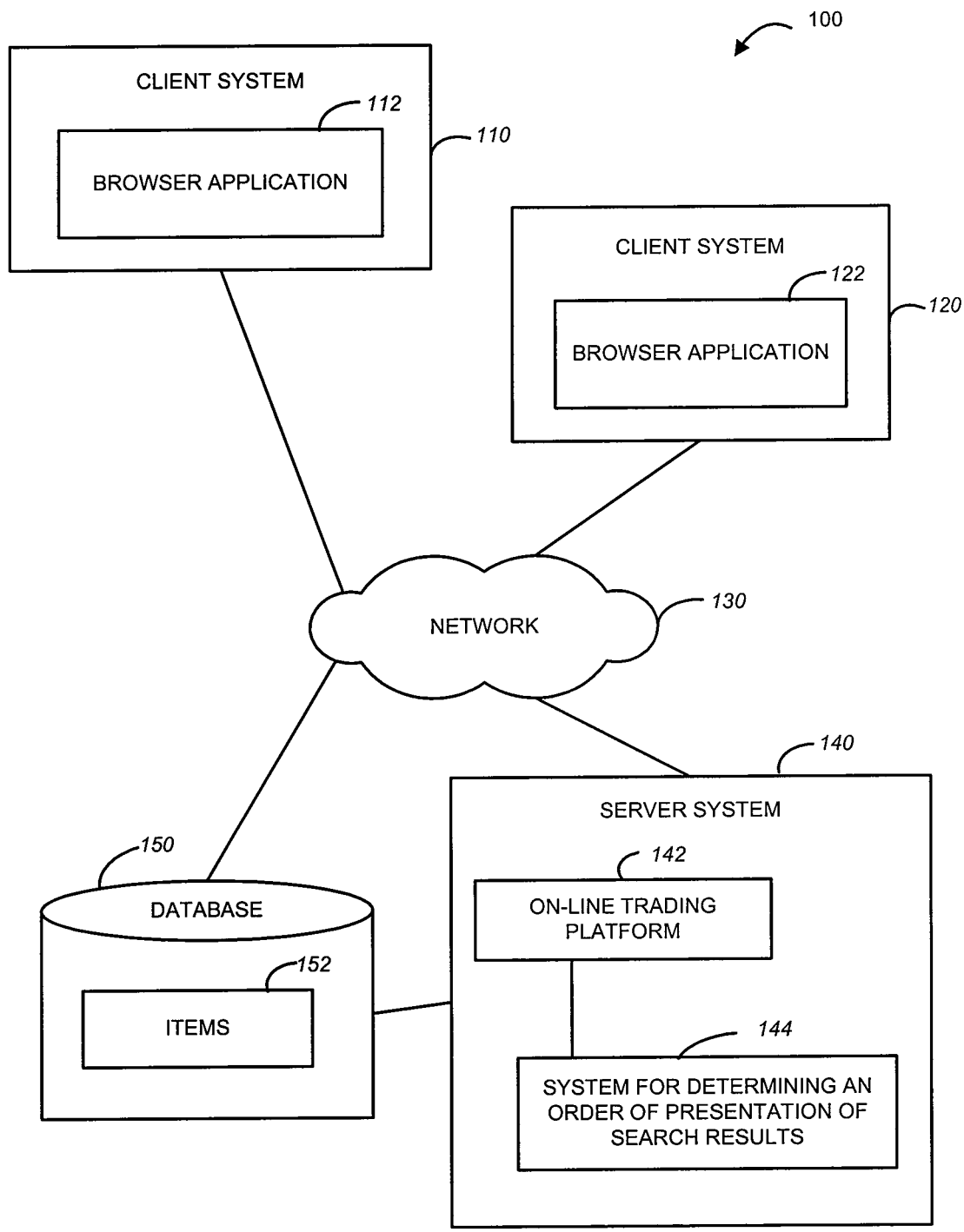
FIG. 1 is a diagrammatic representation of a network environment within which an example method and system for determining an order of presentation of search results may be implemented.

A method and system for determining an order of presentation of search results is described. In the following description, for purposes of explanation, numerous specific details are set forth in order to provide a thorough understanding of an embodiment of the present invention. It will be evident, however, to one skilled in the art, that the present invention may be practiced without these specific details.

In response to a search request, a search engine may return search results that include data items of disparate information formats. For example, where a user is interacting with an on-line trading platform, the formats of search result items may include, for example, an auction format, a known fixed price format, or an unknown fixed-price format. Each of these formats may conceptually be associated with populations or buckets of data items that need to be positioned into a list of search results before they may be presented to a user. Each of the formats are further associated with a different algorithm that is used to compute a score (e.g., a relevance score) for each of the data items for positioning them among the search results. Intermingling of the data items in the search results based on respective scores associated with the data items may not always reflect relative relevance of the items accurately, because a score for a data item from one population (e.g., associated with a first format) may not be directly comparable with a score of a data item from another population (e.g., associated with a second format).

In one example embodiment, a method and system may be implemented to determine an order of presentation in the search results, where the search results include sets of data items (populations) associated with different formats, based on a target ratio that reflects exposure percentage in a list of search results to be presented to a user for each of the populations. For example, population exposure percentages for items associated with different formats may be designated as 60% for the auction bucket (containing items associated with the auction format), 30% for the known fixed-price bucket (containing items associated with the known fixed-price format), and 10% for the unknown fixed-price bucket (containing items associated with the unknown fixed-price format). The known fixed-price population refers to items for sale within an on-line trading platform that have an associated purchase history. For example, an on-line trading platform may have static and dynamic information for an item that was previously sold. Such information may be obtained from the demand side (e.g., buyer) or the supply side (seller). The unknown fixed-price population refers to items that have not been previously identified as being for sale within an on-line trading platform. Accordingly, a purchase history does not exist for such an item.

The method and system for determining an order of presentation in the search results may operate by 1) positioning a data item associated with the dominant format type (in this example, the auction format) as the first item in the search results list; 2) selecting, at random, another format type and the associated candidate bucket; 3) calculating the candidate bucket exposure percentage if an item from the selected format type were to be added to the search results list; and 4) comparing the candidate bucket exposure percentage with the desired bucket exposure percentage. Steps 2-4 may be iterated until a bucket exposure percentage that is closest to the desired bucket exposure percentage is identified. For example, the system may first select a data item from the auction population because the auction format is the dominant format (in this example, 60%). Next, the system may select a data item from the known fixed price population to achieve a ratio of 50%, 50%, 0%, which is closest to the desired ratio (in this example, 60%, 30%, 10%).

A relationship between the bucket exposures of items of any two format types may be expressed as a ratio (termed "target ratio"). In the example above, the target ratio between the number of items in the auction format and the number of items in the fixed-price format is 6:3. An example system for determining an order of presentation in the search results may be configured to first obtain search results in the form of a first set comprising items in the auction format and a second set comprising items in the fixed-price format and then generate a list of search results ordered based on the 6:3 target ratio. As in the example above, the first item selected to be placed in the list of search results is from the auction set (as the auction set is the dominating format type in this example). In order to determine the next item to be added to the list of results, the system may determine respective resulting ratios in the list of results, assuming the next selected item is from the first set or from the second set. The next item is selected from a set if an assumed selection of the next item from that set results in a ratio that is closer to the target ratio.

The target ratio may be optimized by monitoring revenue while adjusting respective exposure percentages for items in different formats. For example, where search results comprise two populations including auction items and fixed priced items, the search results may be experimentally presented to users based on the target ratio or based on exposure percentages. The revenue generated with respect to items associated with different formats may be monitored for a period of time, and, based on the monitored revenue, the target ratio may be adjusted to increase exposure of items in a format that was determined as associated with greater revenue. For example, revenues may be measured for bucket exposure percentages, including 47% auction and 53% fixed price mix, or 48% auction and 52% fixed-price mix, or 49% auction and 51% fixed-price mix, or any other mix that adds up to 100%. The combination of exposure percentages associated with the highest revenue may be used for configuring the system for determining an order of presentation of the search results.

It will be noted that the method and system for determining an order of presentation of the search results may be utilized beneficially outside of the field of electronic commerce, e.g., wherever disparate information formats are identified. An example method and system for determining an order of presentation of the search results may be implemented in the context of a network environment 100 illustrated in FIG. 1.

As shown in FIG. 1, the network environment 100 may include client systems (or simply clients) 110 and 120 and a server system 140. The server system (or simply the server) 140, in one example embodiment, may host an on-line trading platform 142. The client systems 110 and 120 may run respective browser applications 112 and 122 and may have access to the server system 140 via a communications network 130. The communications network 130 may be a public network (e.g., the Internet, a wireless network, etc.) or a private network (e.g., a local area network (LAN), a wide area network (WAN), Intranet, etc.).

The client system 110 may utilize the browser application 112 to access services provided by the server system 140. For example, the client 110 may access services provided by a system associated with the on-line trading platform 142. The server 140 may also host a system 144 for determining an order of presentation of search results. The system 144 may be configured to process search results associated with the on-line trading platform 142 or any results of searching for information on the World Wide Web. While the system 144 is illustrated as a stand-alone module, the system 144 may be implemented, e.g., as part of the on-line trading platform 142. As shown in FIG. 1, the server 140 is connected to a database 150 that may store items 152 that may be associated with different information formats, such as the auction format, the known fixed-price format and the unknown fixed-price format. An example system 144 for determining an order of presentation of search results is illustrated in FIG. 2.

Figure 2:
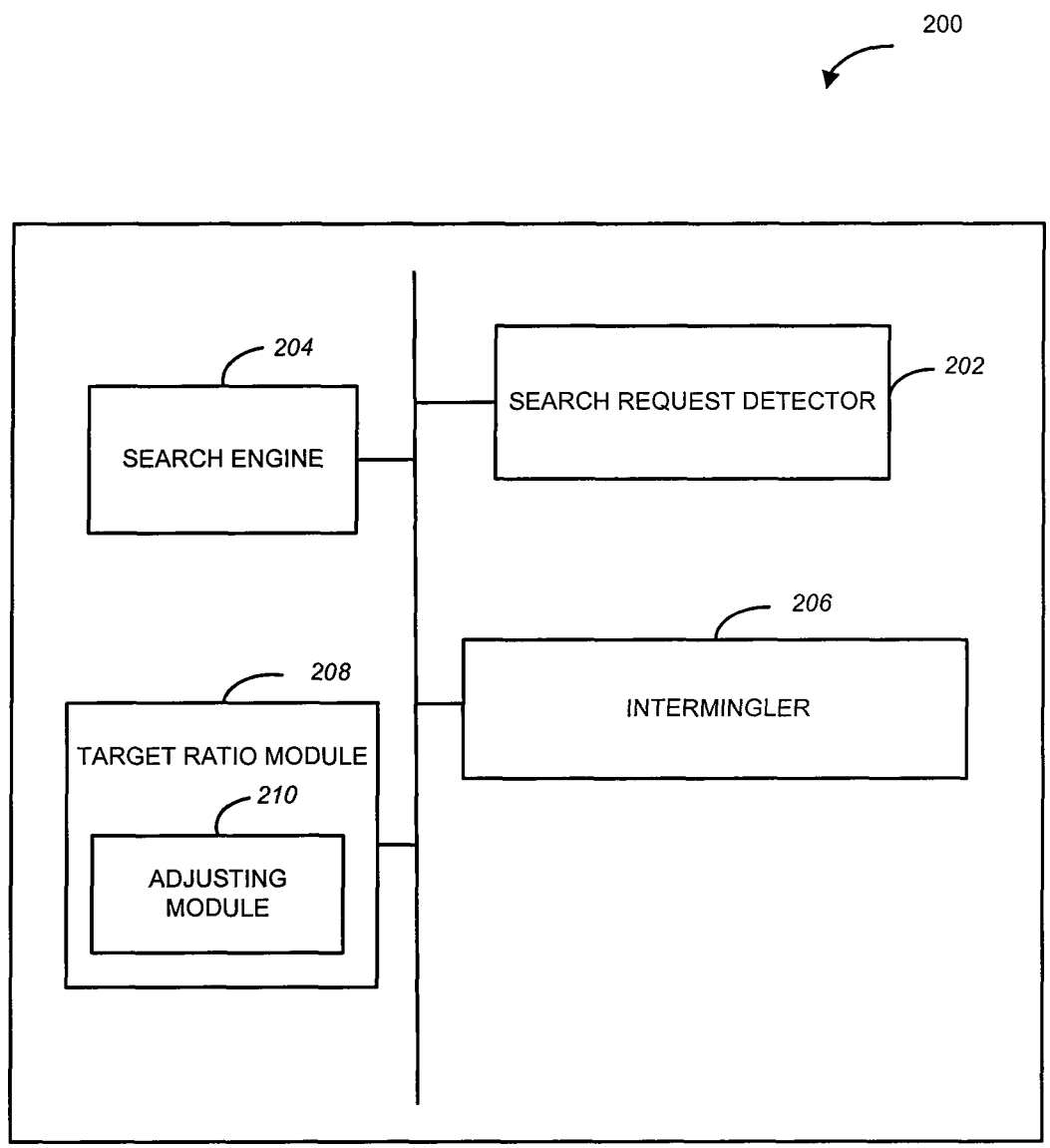
FIG. 2 is block diagram of a system for determining an order of presentation of search results, in accordance with one example embodiment.

FIG. 2 is a block diagram of a system 200 for determining an order of presentation of the search results, in accordance with one example embodiment. As shown in FIG. 2, the system 200 includes a search request detector 202, a search engine 204, an intermingler 206, and a target ratio module 208. The search request detector 202 may be configured to receive a search request (e.g., from the client systems 110 and 120 of FIG. 1 controlled by users), and the search engine 204 may be configured to determine search results based on the search request. The search results may comprise a first set of items in a first format (e.g., a set of items in the auction format) and a second set of items in a second format (e.g., a set of items in the fixed-price format). The number of items in the first set and the number of items in the second set may reflect a predetermined target ratio and respective exposure percentages for items in the first format and items in the second format, determined by the target ratio module 208.

The intermingler 206 may be configured to determine an order of presentation of the search results based on the target ratio, which is described in further detail below, with reference to FIG. 3 and FIG. 4. The target ratio module 208 may include an adjusting module 210 configured to dynamically adjust the target ratio and the associated exposure percentages based on the monitored revenue with respect to items in different formats. An example method for determining an order of presentation of the search results can be described with reference to FIG. 3.

Figure 3:
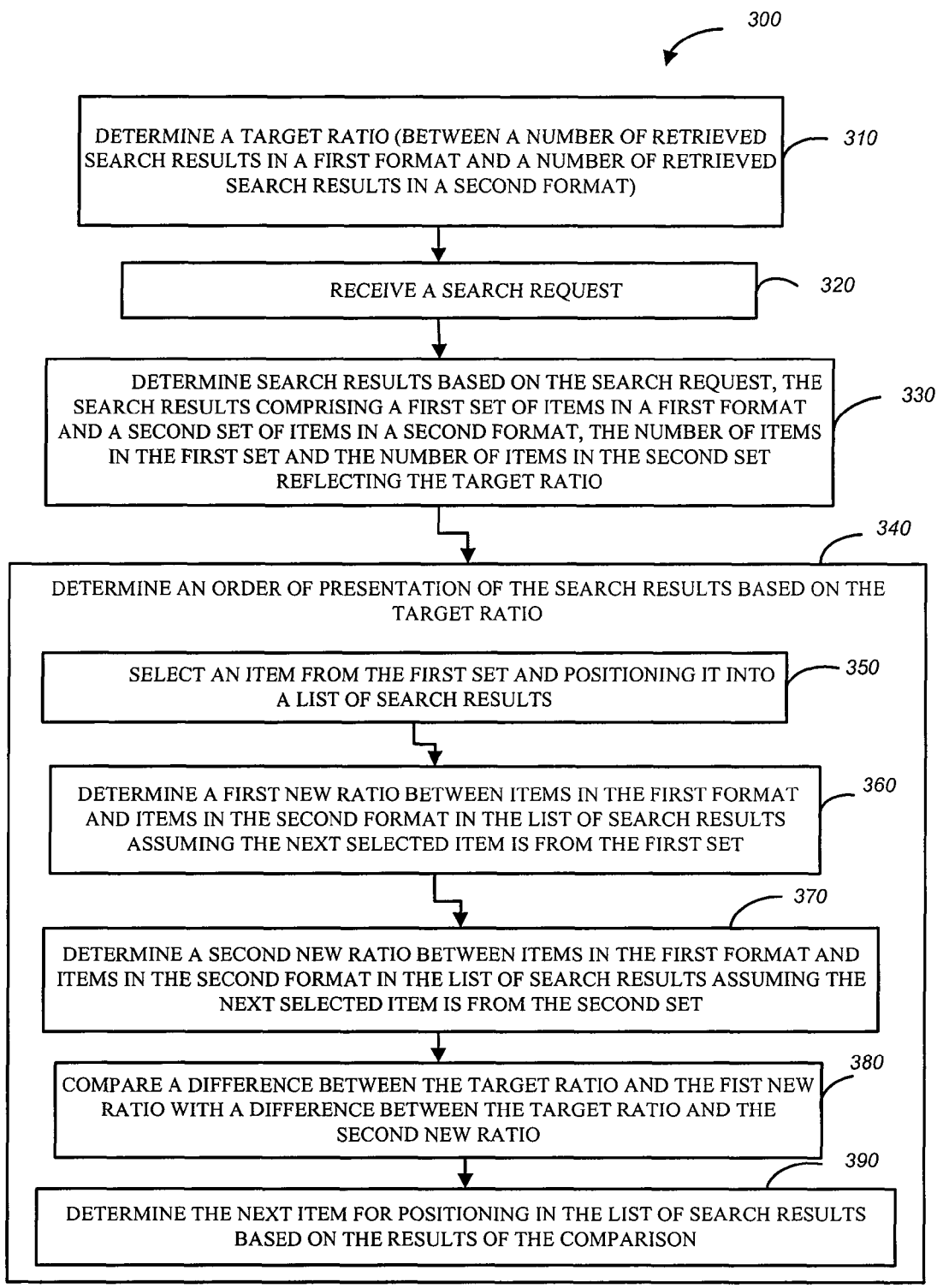
FIG. 3 is a flow chart of a method for determining an order of presentation of search results, in accordance with an example embodiment.

FIG. 3 is a flow chart of a method 300 for determining an order of presentation of the search results based on the target ratio, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 for determining an order of presentation of the search results shown in FIG. 2.

As shown in FIG. 3, the method 300 commences at operation 310, when the target ratio module 208 determines a target ratio reflecting exposure percentages of items in different formats in a search results list, ordered for presentation to the requesting user. At operation 320, the search request detector 202 of FIG. 2 receives a search request. The search engine 204 of FIG. 2 determines search results based on the search request, at operation 330. The search results may include a first set of items in a first format and a second set of items in a different format. The number of items in the first set and the number of items in the second set may reflect the target ratio determined at operation 310. At operation 340, the intermingler 206 of FIG. 2 determines an order of presentation of the search results returned by the search engine 204, based on the target ratio.

The operation 340, determining of an order of presentation of the search results, may be performed as shown in operations 350-390. At operation 350, an item from the first set is selected and positioned in a list of search results. Then, in operation 360, a first new ratio between items from the first set in the list of search results and items from the second set in the list of search results is determined, assuming the next selected item is from the first set. A second new ratio (between items from the first set in the list of search results and items from the second set in the list of search results), assuming the next selected item is from the second set, is determined at operation 370. At operation 380, the intermingler 206 compares a first difference (between the first new ratio and the target ratio with a second difference between the second new ratio and the target ratio) and selects the next item for positioning in the list of search results, based on a result of the comparing, at operation 390. For example, the intermingler 206 may be configured to select the next item from the first set of items in the first format and position it in the list of search results as the next item if it is determined that the first difference is less than the second difference.

As mentioned above, the target ratio may reflect respective exposure percentages for items in the first format and items in the second format. FIG. 4 is a flow chart of a method 400 for determining an order of presentation of the search results based on respective exposure percentages designated for items in different formats, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 for determining an order of presentation of the search results shown in FIG. 2.

Figure 4:
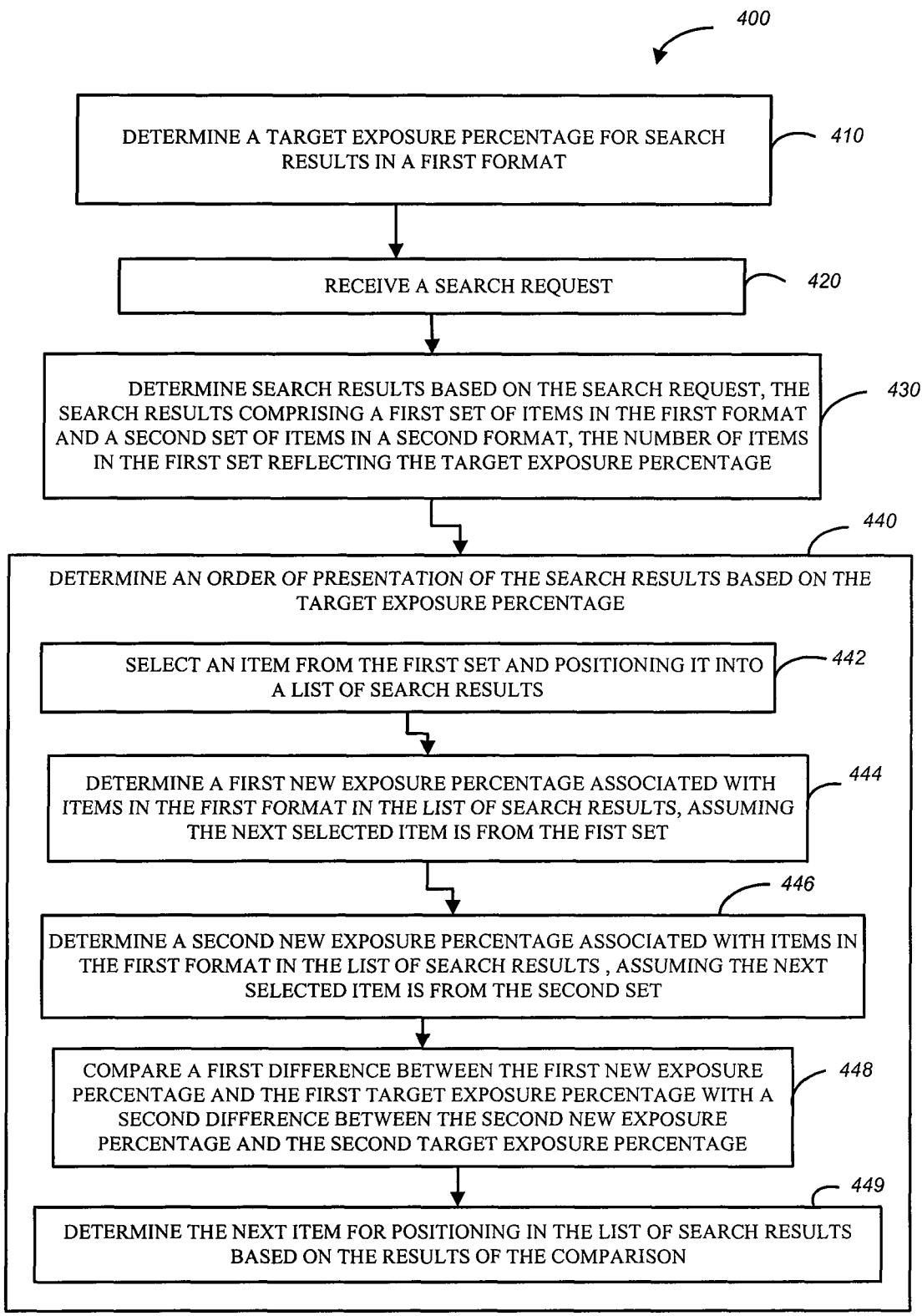
FIG. 4 is a flow chart of a method for determining an order of presentation of search results, utilizing a target exposure percentage for items associated with a certain format, in accordance with an example embodiment.

As shown in FIG. 4, the method 400 commences at operation 410, when the target ratio module 208 determines a target exposure percentage for items in a first format in a search results list. At operation 420, the search request detector 202 of FIG. 2 receives a search request. The search engine 204 of FIG. 2 determines search results based on the search request, at operation 430. The search results include a first set of items in a first format and a second set of items in a different format. The number of items in the first set reflects the target exposure percentage determined at operation 410. At operation 440, the intermingler 206 of FIG. 2 determines an order of presentation of the search results returned by the search engine 204, based on the target exposure percentage.

At operation 442, an item from the first set is selected and positioned in the list of search results. At operation 444, the intermingler 206 determines a first new exposure percentage associated with items in the first format in the list of search results, assuming the next selected item is from the first set. Then the intermingler 206 determines a second new exposure percentage associated with items in the first format in the list of search results, assuming the next selected item is from the second set, at operation 446. The comparing of a first difference between the first new exposure percentage and the target exposure percentage with a second difference between the second new exposure percentage and the target exposure percentage occurs at operation 448. The result of the comparing is used, at operation 449, for selecting the next item for positioning in the list of search results, based on a result of the comparing. Specifically, in one example embodiment, the determination of whether to select the next item to be presented in the list of search results from the first set or from the second set is made such that the resulting exposure of the items in the first format is closer to the target exposure percentage.

As mentioned above, the target ratio and respective exposure percentages for items in different formats may be optimized based on monitored revenue associated with items in these different formats while the target ratio and exposure percentages are being enforced by the intermingler 206 of FIG. 2. This approach to optimizing the target ratio may be utilized, e.g., in the context of an on-line trading platform. An example method for dynamically updating a target ratio reflecting respective exposures of items associated with different formats may be described with reference to FIG. 5.

Figure 5:
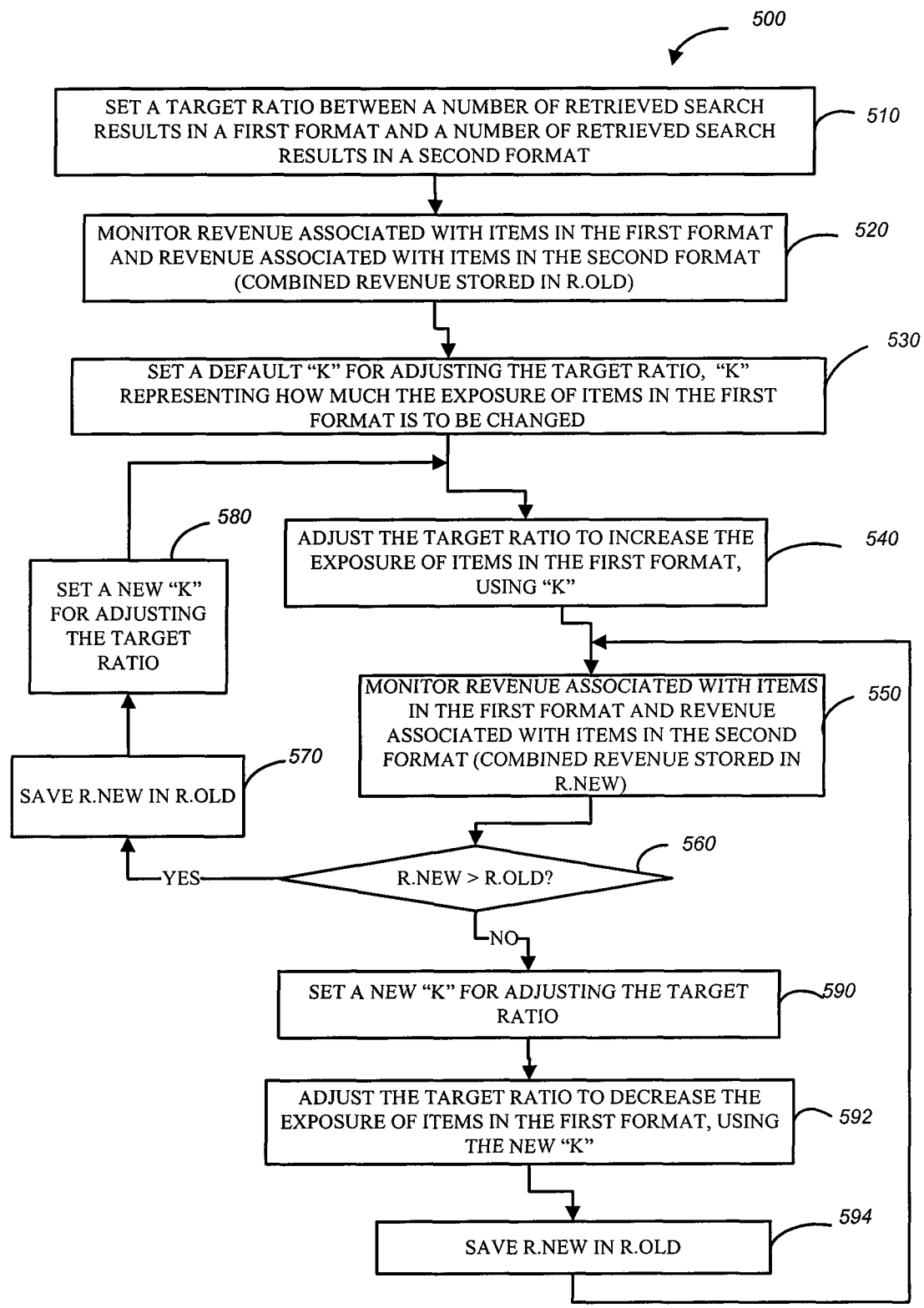
FIG. 5 is a flow chart of a method for dynamically updating a target ratio reflecting respective exposures of items associated with different formats, in accordance with an example embodiment.

FIG. 5 is a flow chart of a method 500 for optimizing an exposure percentage of items in a certain format, according to one example embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 for determining an order of presentation of the search results shown in FIG. 2.

As shown in FIG. 5, the method 500 commences with the target ratio module 208 of FIG. 2 setting a target ratio between the number of retrieved search results in a first format and a number of retrieved search results in a second format, at operation 510. Revenue associated with items in the first and second formats is monitored for a period of time and stored (e.g., as "R.old"), at operation 520. At operation 530, the target ratio module 208 sets a default value "K" for adjusting the target ratio. In one embodiment, "K" represents how much the exposure of items in the first format is to be changed. At operation 540, the adjusting module 210 adjusts the target ratio to increase the exposure of items in the first format, using "K." It will be noted that, in other embodiments, the first adjustment of the target ratio may be to decrease the exposure of items in the first format. After the target ratio is adjusted, another period of monitoring revenue associated with items in the first and second format commences at operation 550. The revenue monitored at operation 550 is stored as "R.new." The operations that follow relate to determining whether the adjustment of the target ratio resulted in increased revenue and, if so, adjusting the target ratio further in the same direction. If, however, the adjustment of the target ratio resulted in decreased revenue, the target ratio is adjusted in reverse direction, as is shown in operations 560-580.

At operation 560, the revenue associated with the target ratio prior to adjustment (R.old) is compared to the revenue R.new associated with the adjusted target ratio. If the revenue has increased as a result of the adjustment (R.new is greater than R.old), the method 500 proceeds to operation 540 to further increase exposure of items in the first format. Prior to that, however, R.new is saved in R.old (such that R.new becomes the new R.old), and a new "K" may be set at operation 580. If, however, it is determined, at operation 560, that the revenue has not increased as a result of the adjustment (R.new is not greater than R.old), the method 500 proceeds to operation 592 to decrease exposure of items in the first format using a new "K" set at operation 590. R.new is saved in R.old (such that R.new becomes the new R.old), at operation 594. The method 500 may continue to adjust the target ratio periodically in order to optimise revenue derived from items in the first and second formats.

Figure 6:
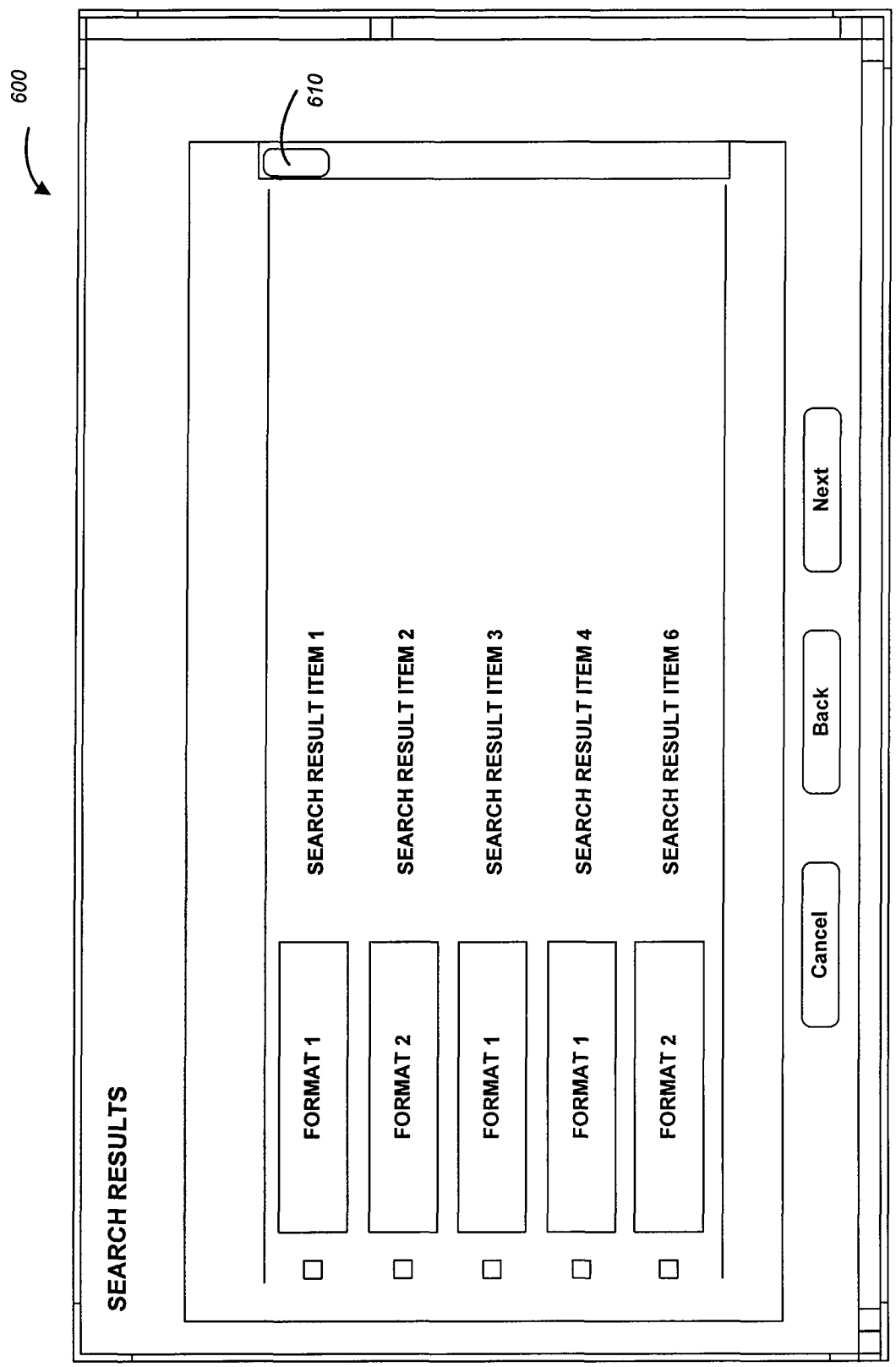
FIG. 6 is an example user interface illustrating a presentation of search results, in accordance with an example embodiment.

FIG. 6 illustrates an example user interface (UI) 600 for presenting search results. In this example, the target ratio between the number of items in the first format and the number of items in the second format is 3:1, and the respective exposure percentages are 75% and 25%. The results displayed by the UI 600 may be scrolled up and down using a scroll bar 610.

Figure 7:
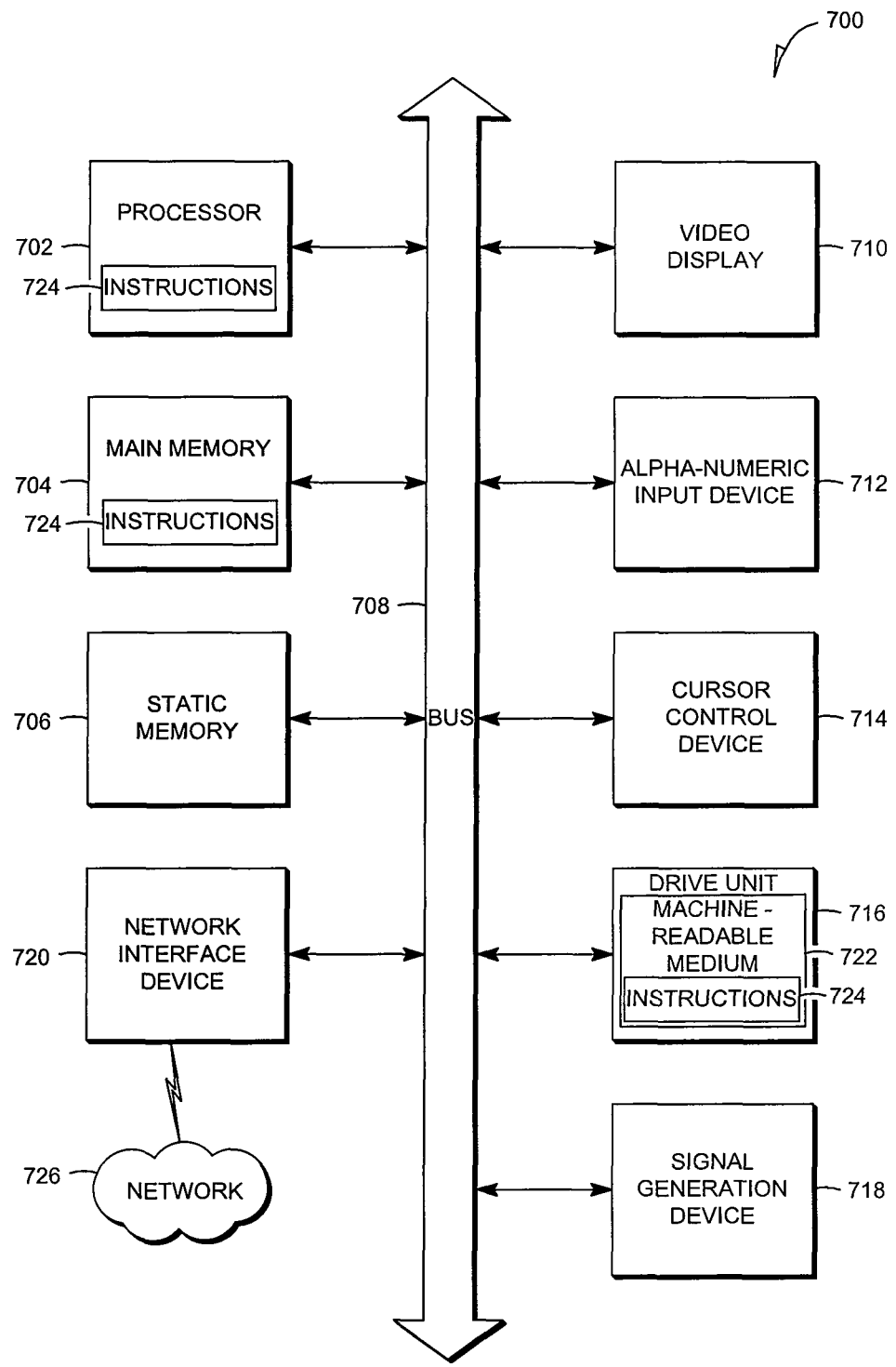
FIG. 7 is a diagrammatic representation of an example machine in the form of a computer system within which a set of instructions for causing the machine to perform any one or more of the methodologies discussed herein may be executed.

FIG. 7 shows a diagrammatic representation of a machine in the example form of a computer system 700 within which a set of instructions for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media.

The instructions 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, a method and system for determining an order of presentation of the search results has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. For example, while an embodiment has been described with reference to an on-line trading platform, a method and system may be implemented and utilized advantageously in the context of various other on-line platforms, as well as a stand-alone application.

What is claimed is:

1. A computer-implemented system comprising:
   a search request detector to receive a search request;
   a search engine to determine search results based on the search request, the search results comprising a first set of items in a first format and a second set of items in a second format, a number of items in the first set and the number of items in the second set reflecting a target ratio; and
   an intermingler to determine an order of presentation of the search results in a list of search results based on the target ratio, the order of presentation comprising a respective position of each of the search result within the list of search results, the intermingler to select a next item for positioning in the list of search results based on a desired exposure percentage associated with the first set of items in the first format.

2. The system of claim 1, wherein the intermingler is to:
   select an item from the first set and position it in the list of search results;
   determine a first new ratio between items from the first set in the list of search results and items from the second set in the list of search results, assuming a next selected item is from the first set;
   determine a second new ratio between items from the first set in the list of search results and items from the second set in the list of search results, assuming the next selected item is from the second set;
   compare a first difference between the first new ratio and the target ratio with a second difference between the second new ratio and the target ratio; and
   select a next item for positioning in the list of search results from the first set or from the second set, based on a result of the comparing.

3. The system of claim 2, wherein the intermingler is to:
   determine that the first difference is less than the second difference; and
   select the next item from the first set of items in the first format and position it in the list of search results as the next item.

4. The system of claim 1, wherein the search request is related to an on-line trading platform.

5. The system of claim 4, wherein the first format is associated with auction items available via the on-line trading platform.

6. The system of claim 4, wherein the first format is associated with fixed-price items available via the on-line trading platform.

7. The system of claim 4, comprising an adjusting module to periodically update the target ratio based on revenue associated with items in the first format and items in the second format.

8. The system of claim 7, wherein the adjusting module is to:
   monitor, over a period of time, revenue associated with items in the first format and revenue associated with items in the second format;
   determine that the monitored revenue associated with items in the first format is greater than monitored revenue associated with items in the second format; and
   adjust the target ratio to increase exposure of items in the first format.

9. The system of claim 1, wherein the search request is related to searching for information on the World Wide Web.

10. The system of claim 1, wherein the target ratio is associated with a target exposure percentage for items in the first format, and the intermingler is to:

determine a first new exposure percentage in the list of search results for items from the first set, assuming a next selected item is from the first set;

determine a second new exposure percentage in the list of search results for items from the first set, assuming the next selected item is from the second set;

compare a first difference between the first new exposure percentage and the target exposure percentage with a second difference between the second new exposure percentage and the target exposure percentage; and select a next item for positioning in the list of search results from the first set or from the second set, based on a result of the comparing.

11. A computer-implemented method comprising:
using one or more processors to perform operations of:
receiving a search request;
determining search results based on the search request, the search results comprising a first set of items in a first format and a second set of items in a second format, a number of items in the first set and the number of items in the second set reflecting a target ratio; and
determining an order of presentation of the search results in a list of search results based on the target ratio, the order of presentation comprising a respective position of each of the search result within the list of search results, the determining comprising selecting a next item for positioning in the list of search results based on a desired exposure percentage associated with the first set of items in the first format.

12. The method of claim 11, wherein the determining of the order of presentation of the search results comprises:
selecting an item from the first set and positioning it in the list of search results;
determining a first new ratio between items from the first set in the list of search results and items from the second set in the list of search results, assuming a next selected item is from the first set;
determining a second new ratio between items from the first set in the list of search results and items from the second set in the list of search results, assuming the next selected item is from the second set;
comparing a first difference between the first new ratio and the target ratio with a second difference between the second new ratio and the target ratio; and
selecting a next item for positioning in the list of search results from the first set or from the second set, based on a result of the comparing.

13. The method of claim 12, wherein the selecting of the next item for presentation comprises:
determining that the first difference is less than the second difference; and
selecting the next item from the first set of items in the first format and positioning it in the list of search results as the next item.

14. The method of claim 11, wherein the search request is related to an on-line trading platform.

15. The method of claim 14, wherein the first format is associated with auction items available via the on-line trading platform.

16. The method of claim 14, comprising periodically updating the target ratio based on revenue associated with items in the first format and items in the second format.

17. The method of claim 16, wherein the updating of the target ratio comprises:
monitoring, over a period of time, revenue associated with items in the first format and revenue associated with items in the second format;
determining that the monitored revenue associated with items in the first format is greater than the monitored revenue associated with items in the second format; and
adjusting the target ratio to increase exposure of items in the first format.

18. The method of claim 11, wherein the search request is related to searching for information on the World Wide Web.

19. The method of claim 11, wherein the target ratio is associated with a target exposure percentage for items in the first format, the determining of the order of presentation of the search results comprising:
determining a first new exposure percentage in the list of search results for items from the first set, assuming a next selected item is from the first set;
determining a second new exposure percentage in the list of search results for items from the first set, assuming the next selected item is from the second set;
comparing a first difference between the first new exposure percentage and the first target exposure percentage with a second difference between the second new exposure percentage and the second target exposure percentage; and
selecting a next item for positioning in the list of search results from the first set or from the second set, based on a result of the comparing.

20. A non-transitory machine-readable medium having instruction data to cause a machine to:
receive a search request;
determine search results based on the search request, the search results comprising a first set of items in a first format and a second set of items in a second format, a number of items in the first set and the number of items in the second set reflecting a target ratio; and
determine an order of presentation of the search results in a list of search results based on the target ratio, the order of presentation comprising a respective position of each of the search result within the list of search results, the determining comprising selecting a next item for positioning in the list of search results based on a desired exposure percentage associated with the first set of items in the first format.

* * * * *

UNITED STATES PATENT AND TRADEMARK OFFICE
CERTIFICATE OF CORRECTION

| | | |
|---|---|---|
| PATENT NO. | : 8,775,398 B2 | Page 1 of 1 |
| APPLICATION NO. | : 12/475997 | |
| DATED | : July 8, 2014 | |
| INVENTOR(S) | : Sun et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 426 days.

Signed and Sealed this
Eighth Day of March, 2016

Michelle K. Lee
*Director of the United States Patent and Trademark Office*